(12) United States Patent
Walker et al.

(10) Patent No.: US 6,445,309 B1
(45) Date of Patent: Sep. 3, 2002

(54) METHOD AND APPARATUS FOR DISTRIBUTING PRODUCTS TO VEHICLE OCCUPANTS

(75) Inventors: Jay S. Walker, Ridgefield; James A. Jorasch, Stamford, both of CT (US); John M. Packes, Jr., Hawthorne; Jason Krantz, New York, both of NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/224,486

(22) Filed: Dec. 31, 1998

(51) Int. Cl.⁷ ................................................. G08G 1/01
(52) U.S. Cl. .................. 340/933; 340/928; 340/52; 406/2; 221/211
(58) Field of Search .................... 221/211; 406/2–3; 340/933, 928, 935, 5.2; 186/55, 52, 53

(56) References Cited

U.S. PATENT DOCUMENTS

| | | | | |
|---|---|---|---|---|
| 5,101,200 A | * | 3/1992 | Swett | 340/937 |
| 5,204,675 A | | 4/1993 | Sekine | 340/933 |
| 5,422,473 A | | 6/1995 | Kamata | 235/389 |
| 5,482,139 A | | 1/1996 | Rivalto | 186/36 |
| 5,590,407 A | | 12/1996 | Ishikawa et al. | 455/66 |
| 5,637,846 A | | 6/1997 | Boers et al. | 235/383 |
| 5,717,374 A | | 2/1998 | Smith | 340/438 |
| 5,725,124 A | * | 3/1998 | Bustos et al. | 221/211 |
| 5,864,831 A | | 1/1999 | Schuessler | 705/417 |
| 5,934,439 A | | 8/1999 | Kanoh et al. | 194/205 |
| 6,073,840 A | * | 6/2000 | Marion | 235/381 |

FOREIGN PATENT DOCUMENTS

| | | |
|---|---|---|
| GB | 2317258 | 3/1998 |
| JP | 10091864 | 4/1998 |

OTHER PUBLICATIONS

"Welcome to E–ZPass", (http://www.mta.nyc.ny.us/bandt/html/ezwelcom.htm), download date: Nov. 17, 1999.

"Drivers' Lament: Port Authority Holds Us Hostage", The Record, Nov. 19, 1989, Opinion Section at p. O03.

"Help Commuters, Don't Hurt Them", The Record, Nov. 22, 1989, Opinion Section at p. B06.

"For Release Wednesday, Nov. 17, 1993: Chemical Bank at AT&T Smart Cards Form Strategic Alliance", AT&T, (http://www.att.com/press/1193/931117.blb.html), download date: Sep. 14, 1998.

"E–Z Pass Shouldn't Be So Hard to Get", The New York Times, Mar. 27, 1997 Section A. at p. 28.

"Advanced Traveler Information System(ATIS), An Expansion of the SafeAuto Home Page" (page modified Apr. 18, 1997), Planthink Concepts, Inc., (http://ourworld.compuserve.com/homepages/DColemereJr/traveler.html), download date: Sep. 15, 1998.

"Safe Auto—Tollbooths, An Expansion of the SafeAuto Home Page" (updated Feb. 7, 1998), Planthink Concepts, Inc., (http://ourworld.compuserve.com/homepages/DColemereJr/tollboot.html), download date: Sep. 15, 1998.

"E–ZPass Contractor's Projects are Lagging",ETTM on the Web, (http://www.ettm.com/news/nj–lagging.html), Mar. 5, 1998.

(List continued on next page.)

Primary Examiner—Daryl Pope
(74) Attorney, Agent, or Firm—Dean P. Alderucci (57) ABSTRACT

A method and apparatus are disclosed for dispensing a product at a toll station. In accordance with the present invention, a first method is disclosed for distributing a product at a toll station. The method includes receiving an account identifier to identify an account. The method further includes outputting an offer to distribute a product. The offer may include offer criteria such as price in the case of a sale, or rental period, rental fee and extra fees such as late fees in the case of a rental. The method further includes detecting acceptance of the offer and dispensing the product. The method also includes processing a transaction based on the account identifier and the offer criteria.

7 Claims, 8 Drawing Sheets

OTHER PUBLICATIONS

"Federal–Highway–Express Sked Federal Highway Express Toll", AP Worldstream, May 15, 1998, Washington Section—general news.

Mark Barrett and Julie Ball, "Free–Standing Drug Stores Offer Shopper Greater Convenience: Trend of Pharmacies Built Away From Shopping Malls Here to Stay, Say Many From The Industry", Asheville Citizen Times, Jun. 8, 1998, Local Section at p. A1.

Lauren Lawley, "Donatos Pizza, Great Steak Debut Free-standing Stores Both Will Put Concept in Place With Local Outlets", Cincinnati Business Courier, Jul. 3, 1998 at p. 5.

"Toll Fees and Coupon Tickets", Hanshin–Nishi Route, (http:/west.park.or.jp/hanshin–expressway/guide/passfee_e.html), download date: Oct. 13, 1998.

"Le Shuttle", French Connections—Channel Crossing Information, (http://www.frenchconnections.co.uk/general/chunnel.html), download date: Nov. 16, 1998.

* cited by examiner

FIG. 1

| PRODUCT IDENTIFIER 210 | PRODUCT DESCRIPTION 212 | AVAILABLE INVENTORY 214 | PRICE 216 |
|---|---|---|---|
| 00-2346 | CARBONATED BEVERAGE | 142 | $0.75 |
| 01-4433 | CANDY BAR | 99 | $0.50 |
| 06-9495 | ORANGE DRINK | 76 | $1.25 |
| RENT-5324 | VHS TAPE | 22 | $2.50/DAY |
| RENT-4567 | COMPACT DISC | 36 | $0.50/HOUR |

FIG. 2

| ACCOUNT IDENTIFIER 310 | ACCOUNT BALANCE 312 | PRODUCT PREFERENCE 1 314 | PRODUCT PREFERENCE 2 316 |
|---|---|---|---|
| NY-TRE-E22 | $41.50 | 00-2346 | 01-4433 |
| CT-P3Z-266 | $33.00 | 01-4433 | -- |
| MA-TRN-689 | $103.75 | 06-9495 | 00-2346 |
| NY-A11-5EZ | $21.00 | RENT-5324 | -- |

FIG. 3

| ACCOUNT IDENTIFIER 410 | PRODUCT SELECTION 1 412 | PRODUCT PRICE 1 414 | PRODUCT SELECTION 2 416 | PRODUCT PRICE 2 418 | TOTAL PRICE 420 |
|---|---|---|---|---|---|
| NY-A11-5EZ | 00-2346 | $0.75 | 01-4433 | $0.50 | $1.25 |
| CT-3PZ-266 | 01-4433 | $0.50 | — | — | $0.50 |
| MA-TRN-689 | 01-4433 | $0.50 | — | — | $0.50 |

METHOD AND APPARATUS FOR DISTRIBUTING PRODUCTS TO VEHICLE OCCUPANTS

BACKGROUND OF THE INVENTION

1. Field of the Invention

The present invention is directed generally to automated toll stations and, more particularly, to a method and apparatus for dispensing and receiving products at a toll station.

2. Description of the Related Art

Millions of automobile drivers employ the highway and roadway systems of the United States every day. A portion of the United States highway and roadway system includes facilities such as toll roads, bridges and tunnels that are funded by tolls collected from vehicle occupants. The tolls for using such facilities are typically collected at toll stations immediately preceding or immediately following use of the facilities.

Historically, toll stations have resulted in significant traffic problems, in part, due to the delay caused by processing the payment of the tolls. In the past, automobiles were required to come to a complete stop in order to pay a toll, usually to a human recipient who was often required to make change for the driver. This and other problems related to vehicle throughput at toll stations have been generally recognized.

There have been various technology-based attempts to improve the throughput of toll stations by reducing the amount of time each automobile must spend at a toll station, or by eliminating the need for an automobile to slow down to pay a toll. Two such attempts, are disclosed in U.S. Pat. Nos. 5,101,200 and 5,422,473 of Swett and Kamata, respectively.

In U.S. Pat. No. 5,101,200, Swett discloses a toll paying system for use with a vehicle passing through a fast lane. The toll paying system of Swett employs a detection means and a class-determining means to detect tag information and determine the class of vehicle passing through the toll lane. The system of Swett further includes a method for paying a toll by charging a toll fee to an account based on the tag information and the class of the vehicle.

In U.S. Pat. No. 5,433,473, Kamata discloses a vehicle security system and automatic roadway toll charging system. According to the system of Kamata, a non-contact type IC card and card reader unit are employed within a vehicle to transmit information to an external device or system. Further, an imaging section generates an image of the vehicle's license plate to detect unauthorized use of the IC card. The information transmitted between the card reader unit and the external device or system is used to automatically charge a toll fee.

These advancements may advantageously increase the throughput at toll stations, but they fail to address other significant problems.

A need therefore exists for a method and apparatus that addresses the deficiencies of prior systems.

SUMMARY OF THE INVENTION

Generally, according to one aspect of the invention, a method and apparatus are disclosed for dispensing a product at a toll station. It is an object of the present invention to provide a method and apparatus that actively promotes the sale of products at a toll station while maintaining high throughput. It is a further object of the present invention to provide a method and apparatus that enables consumers to return rented products at a toll station while maintaining high throughput.

In accordance with the present invention, a first method is disclosed for distributing a product at a toll station. The method includes receiving an account identifier to identify an account. The method further includes outputting an offer to distribute a product. The offer may include offer criteria such as price in the case of a sale, or rental period, rental fee and extra fees such as late fees in the case of a rental.

The method further includes detecting acceptance of the offer and dispensing the product. The method also includes processing a transaction based on the account identifier and the offer criteria.

A second method is disclosed for receiving a product at a toll station. The method includes receiving an account identifier that indicates an account. The method also includes detecting receipt of a product and determining a product identifier corresponding to the product. The method further includes determining whether there is an association between the product identifier and the account identifier. A transaction is then processed based on the account identifier and the product identifier.

A more complete understanding of the present invention, as well as further features and advantages of the present invention, will be obtained by reference to the following detailed description and drawings.

BRIEF DESCRIPTION OF THE DRAWINGS

A more complete appreciation of the invention and many of the attendant advantages thereof may be readily obtained by reference to the following detailed description when considered with the accompanying drawings, wherein.

DETAILED DESCRIPTION

The present invention enables a motorist traveling through a toll station to efficiently purchase, rent and/or return goods without making an additional stop. Many motorists who must stop at a toll station often need to purchase consumer goods. Motorists who need to purchase such goods are not only slowed by the payment of a toll at a toll station, but also slowed by making a second stop to purchase the consumer goods. This is an inefficient use of the motorists' time. Further, stopping to purchase consumer goods presently requires a motorist to exit and enter a roadway or highway numerous times, resulting in additional risk. In addition, motorists exiting a highway to stop in an unfamiliar area have a tendency to get lost. This results in still more wasted time and unnecessary risk.

The present invention thus is advantageous in that it allows a motorist to quickly purchase, rent or return products at a toll station without exiting his vehicle and without undue time at the toll station. No other system known to applicants permits the rapid dispensing of products at a toll station.

Apparatus Architecture

Figure 1:
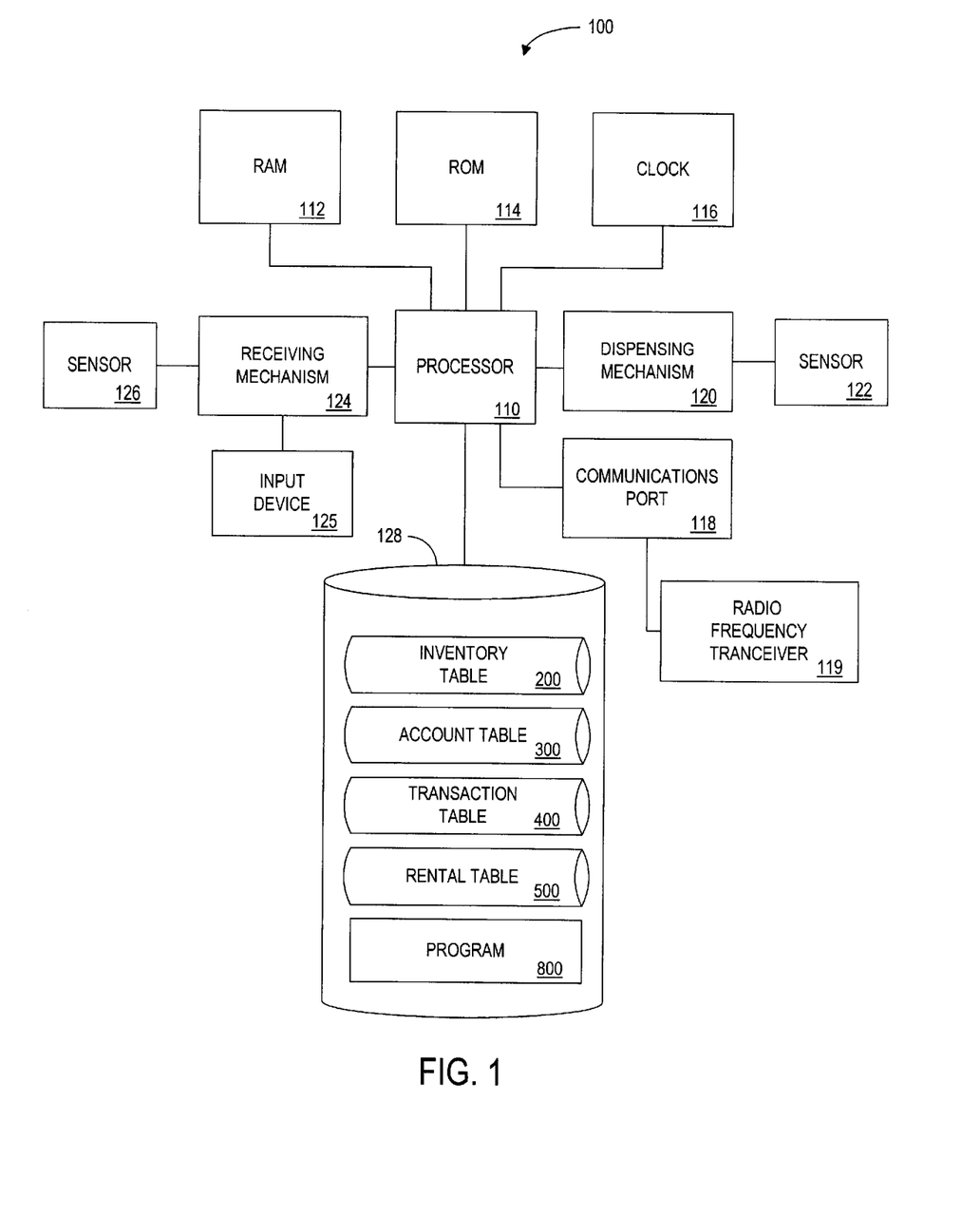
FIG. 1 is a schematic block diagram illustrating the components of an automated toll station according to one embodiment of the present invention.

One embodiment of the method and apparatus of the present invention will now be discussed with reference to FIG. 1. FIG. 1 illustrates the components of an exemplary automatic toll station 100 including the features of the present invention. The operation of toll station 100 is preferably conducted in cooperation with a vehicle including an RF or other transceiver for transmitting account and other information to toll station 100. Although a specific exemplary toll station 100 is referred to throughout the detailed description, the present invention is directed to any automatic sales machine that enables a vehicle occupant to receive goods in exchange for payment without exiting the vehicle. Although payment can be presented through a variety of media including, but not limited to, coins, bills and other currencies, magnetic strip cards and smart cards (whether pre-paid or linked to an account), the payment is preferably presented via a radio frequency transceiver for providing an account identifier. For example, a vehicle may have affixed thereto a device that communicates via a radio frequency signal with a radio frequency transponder, such as those used in the E-Z Pass system of MFS Transtech, the Mobil SpeedPass system of Mobil Corporation, and the Texas Instruments TIRIS system. Those skilled in the art will understand that any means of wireless data transfer may be implemented by toll station 100.

As shown, toll station 100 includes a communications port 118. Communications port 118 may be linked to a radio frequency transceiver 119 for receiving and transmitting account information, motorist identification information, and consumer preferences as well as other information. Toll station 100 further includes random access memory ("RAM") 112, read-only memory ("ROM") 114, and clock 116. These components facilitate processing in a conventional fashion, and they communicate with and are controlled by processor 110. Processor 110 also communicates with communications port 118 and radio frequency transceiver 119 to receive and transmit data between toll station 100 and a vehicle (not shown). In addition, processor 110 controls a dispensing mechanism 120 for distributing products, a sensor 122 for determining if a product was removed from dispensing mechanism 120, a receiving mechanism 124 for receiving returned products, an input device 125 for determining the identity of the returned products, and a sensor 126 for detecting the presence of a returned product. Dispensing mechanism 120 may be similar to those mechanisms used in vending machines to dispense products, such as beverage containers. Sensor 122 may comprise a plunger-type on/off switch, an optical on/off switch, or any device that is able to detect the removal of a product.

When a product is removed from dispensing mechanism 120, sensor 122 detects the removal and sends a signal to processor 110 which directs dispensing mechanism 120 to replace the removed product. In one embodiment, products are stored in a product bin (not shown) above the dispensing mechanism 120. When sensor 122 is activated a retractable peg is retracted, thus allowing another product to drop down, effectively replacing the removed product.

Receiving mechanism 124 is a device capable of receiving rented products, such a bin or enclosure. The receiving mechanism 124 receives a rented product, and sensor 126 detects the presence of the returned product. Upon detection of a product, sensor 126 sends a signal to processor 110 which triggers input device 125 to determine the returned product's identity. Input device 125 may comprise a bar code reader, optical scanner or any other device that is capable of identifying an item. In another embodiment, a rented product is returned to a location other than a toll station, such as a store. One of ordinary skill in the art will realize that many different types of dispensing and receiving schemes may be implemented by toll station 100.

With continuing reference to FIG. 1, data storage device 128 is shown which stores an inventory table 200, an account table 300, a transaction table 400, a rental table 500 and a program 800. Tables 200, 300, 400, and 500 and program 800 are described more fully with reference to FIGS. 2–7B. Program 800 includes instructions for implementing the steps of the present invention. Data storage device 128 is preferably a magnetic disk drive, but could be a CD drive, optical disk drive, RAM drive or any other storage device. Data storage device 128 is preferably a secure device which enables only authorized operators to access program 800 and tables 200, 300, 400 and 500.

Although toll station 100 has been shown with a plurality of components to carry out the instant invention, one or more of these components can be disposed remotely from the toll station 100. Further, a plurality of toll stations may be disposed in communication with a central controller (not shown) which performs one or more of the functions of the structure depicted in FIG. 1 for each of the toll stations.

Data Tables

Figure 2:
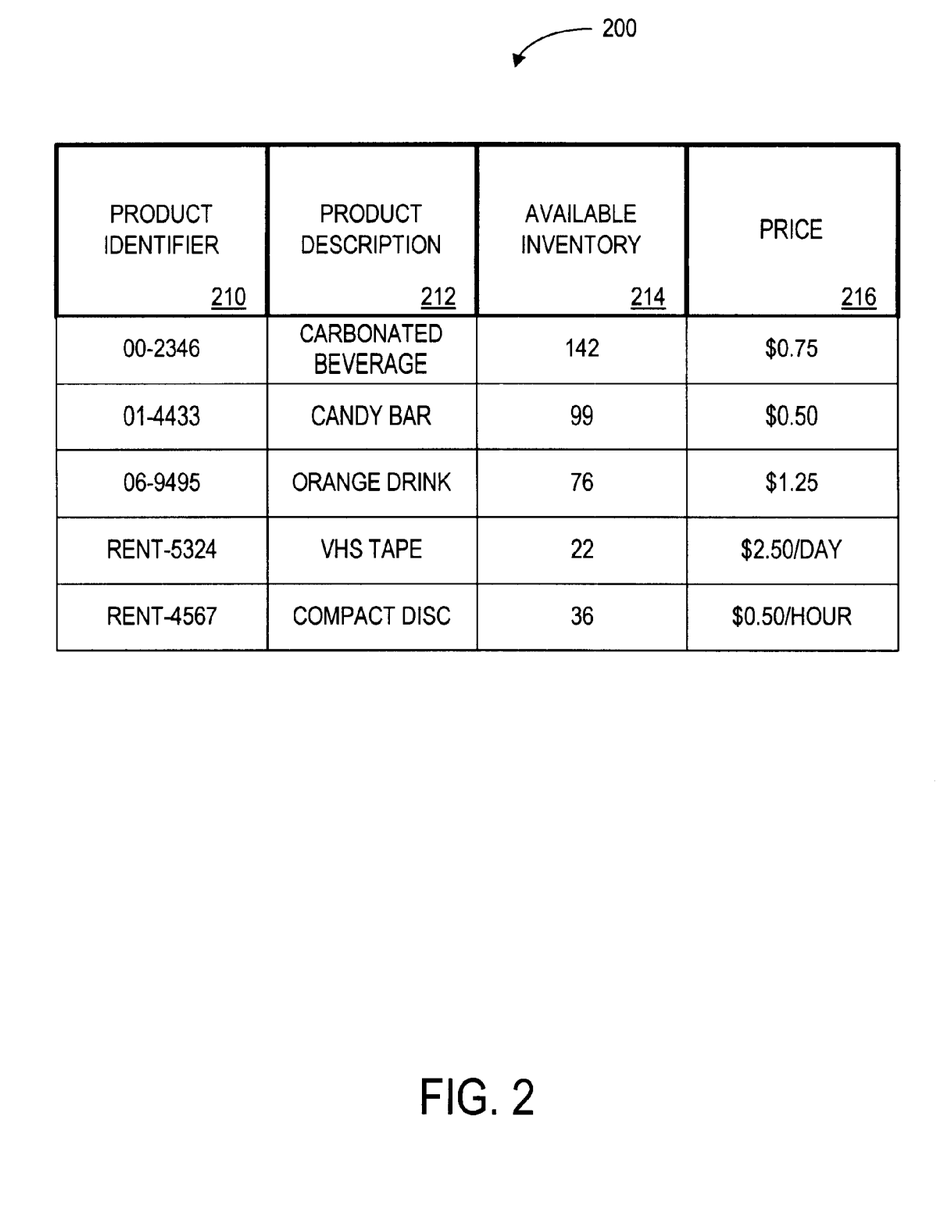
FIG. 2 depicts an exemplary inventory table stored in the memory of the automated toll station of FIG. 1.

FIG. 2 illustrates the contents of an exemplary inventory table 200 stored by data storage device 128 of the present invention. Each record of the table 200 represents inventory data associated with a product dispensed by toll station 100. In particular, table 200 contains fields for a product identifier 210, a product description 212, an available inventory 214, and a price 216, each of which will now be described in greater detail below.

Each record of table 200 includes a product identifier field 210 that uniquely identifies a product distributed by toll station 100 and a corresponding record of table 200. Product description field 212 stores a brief description of the product associated with a record of inventory table 200. Inventory table 200 also includes available inventory field 214 for storing a quantity of available items associated with product identifier 210. Available inventory field 214 is updated by an operator upon stocking toll station 100 to reflect the number of items stocked. Program 800 includes processing instructions for updating available inventory field 214 upon each sale of a product, in order to maintain an accurate indication of the quantity of every product. Inventory table 200 further includes price field 216 representing the sale price or rental fee for the associated product.

Figure 3:
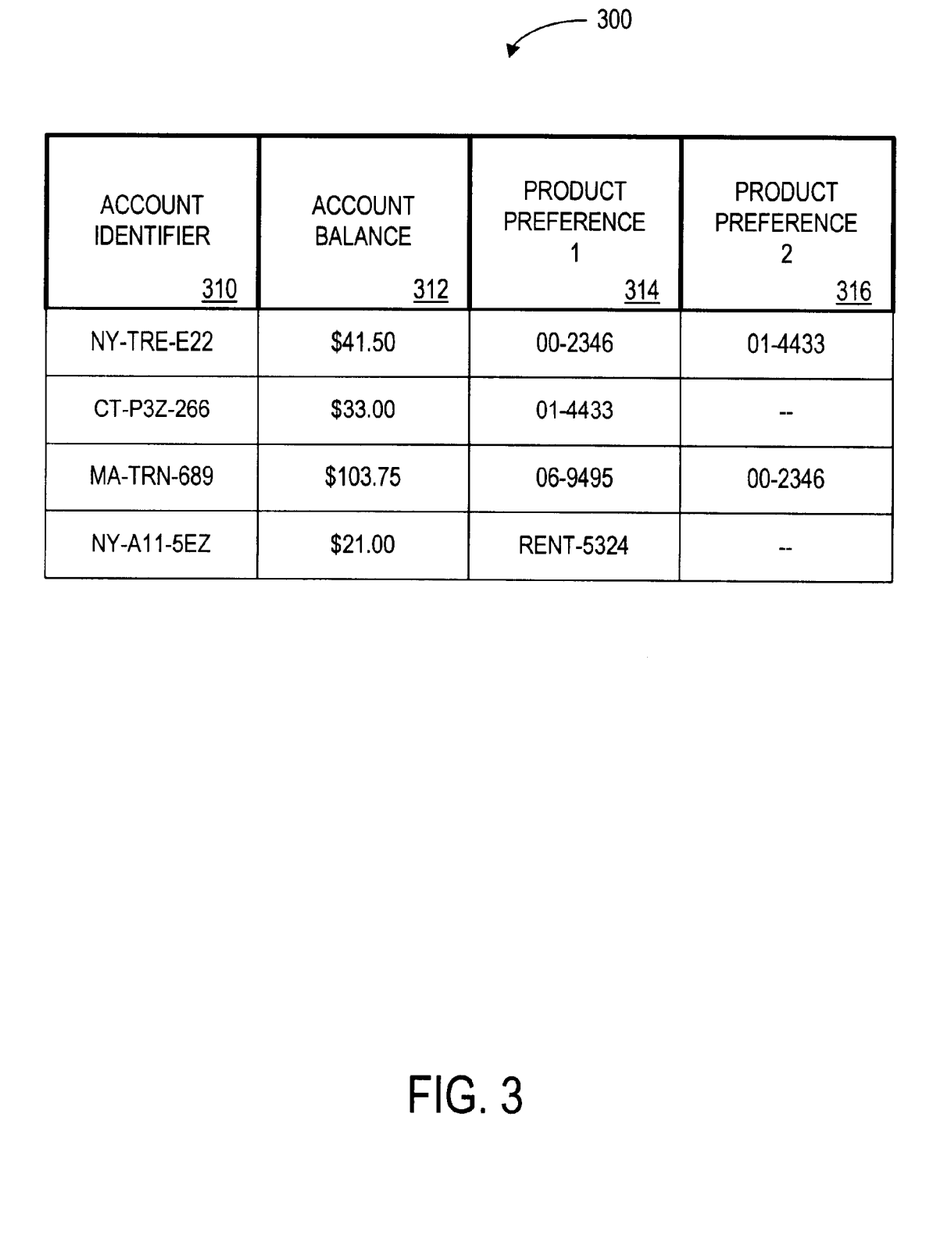
FIG. 3 depicts an exemplary account table stored in the memory of the automated toll station of FIG. 1.

Referring now to FIG. 3, the contents of exemplary account table 300 are illustrated. Account table 300 includes fields for storing an account identifier 310, an account balance 312, a first product preference 314 and a second product preference 316. Every record of account table 300 is associated with a customer account that is identified by account identifier field 310. Account balance field 312 stores a monetary balance corresponding to the associated account. Product preference fields 314 and 316 store data representing the preferred products of the owner of the associated account. Any number of product preferences could be stored in the table 300.

Figure 4:
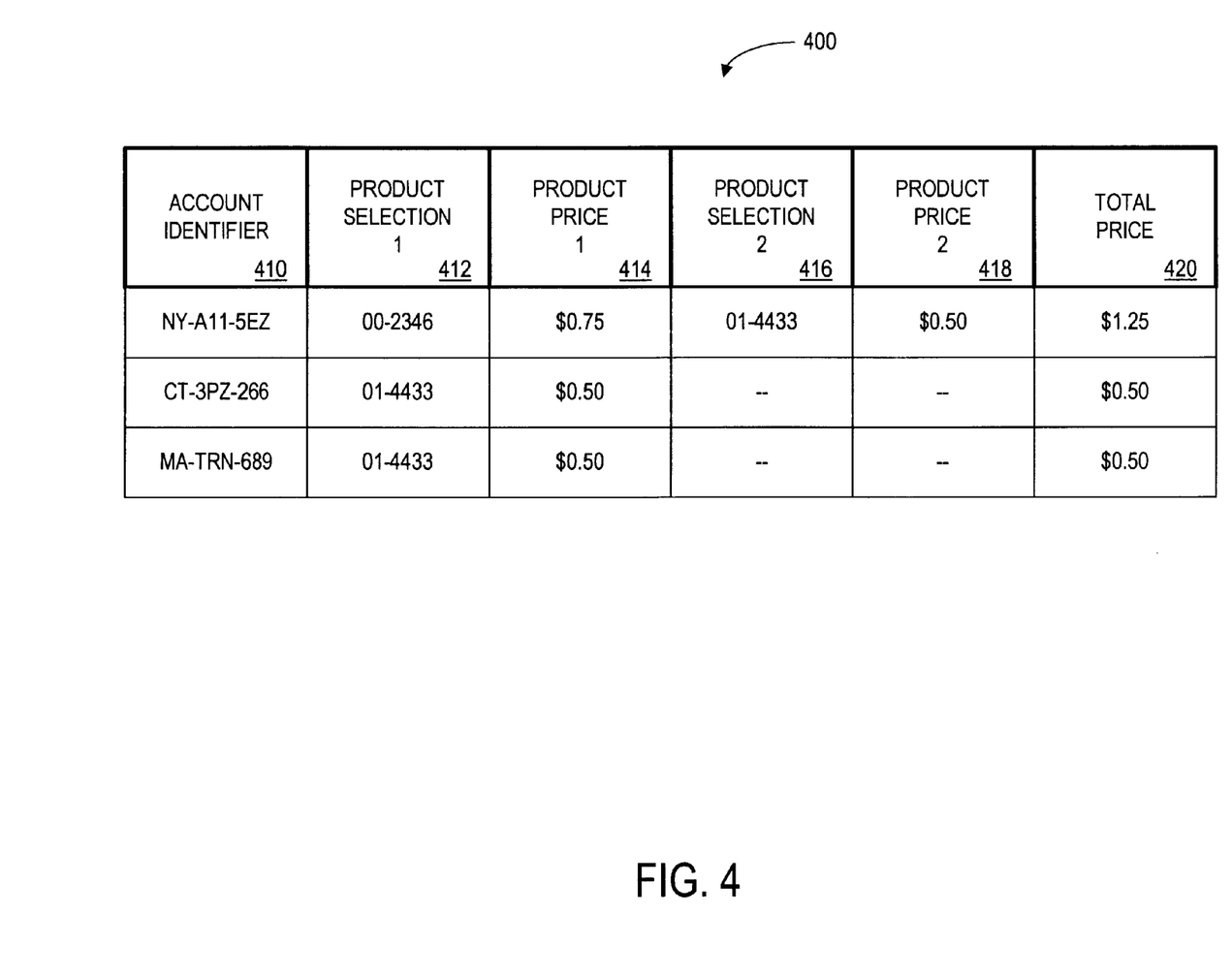
FIG. 4 depicts an exemplary transaction table stored in the memory of the automated toll station of FIG. 1.

FIG. 4 illustrates the contents of an exemplary transaction table 400 stored by data storage device 128 of the present invention. Each record of the transaction table 400 represents a sale completed by toll station 100. Transaction table 400 contains fields for an account identifier 410, a first product selection 412, a first product price 414, a second product selection 416, a second product price 418 and a total price 420.

Account identifier field 410 stores the account identifier of a consumer purchasing at least one product from toll station 100. Account identifier 410 is preferably received from a transceiver associated with the consumer's vehicle and is verified with reference to account table 300. Product selection fields 412 and 416 store the product identifiers corresponding to the products purchased by the consumer. Product price fields 414 and 418 represent the price corresponding to product selections 412 and 416, respectively. Total price field 420 represents the total purchase price for the transaction (i.e. the sum of product price fields 414 and 418).

Although an exemplary transaction table 400 is illustrated as containing data for up to two product selections, one of ordinary skill will appreciate that more or fewer product selections may be associated with a single transaction record. It should be noted that there may be various means for recording and tracking transactions.

Figure 5:
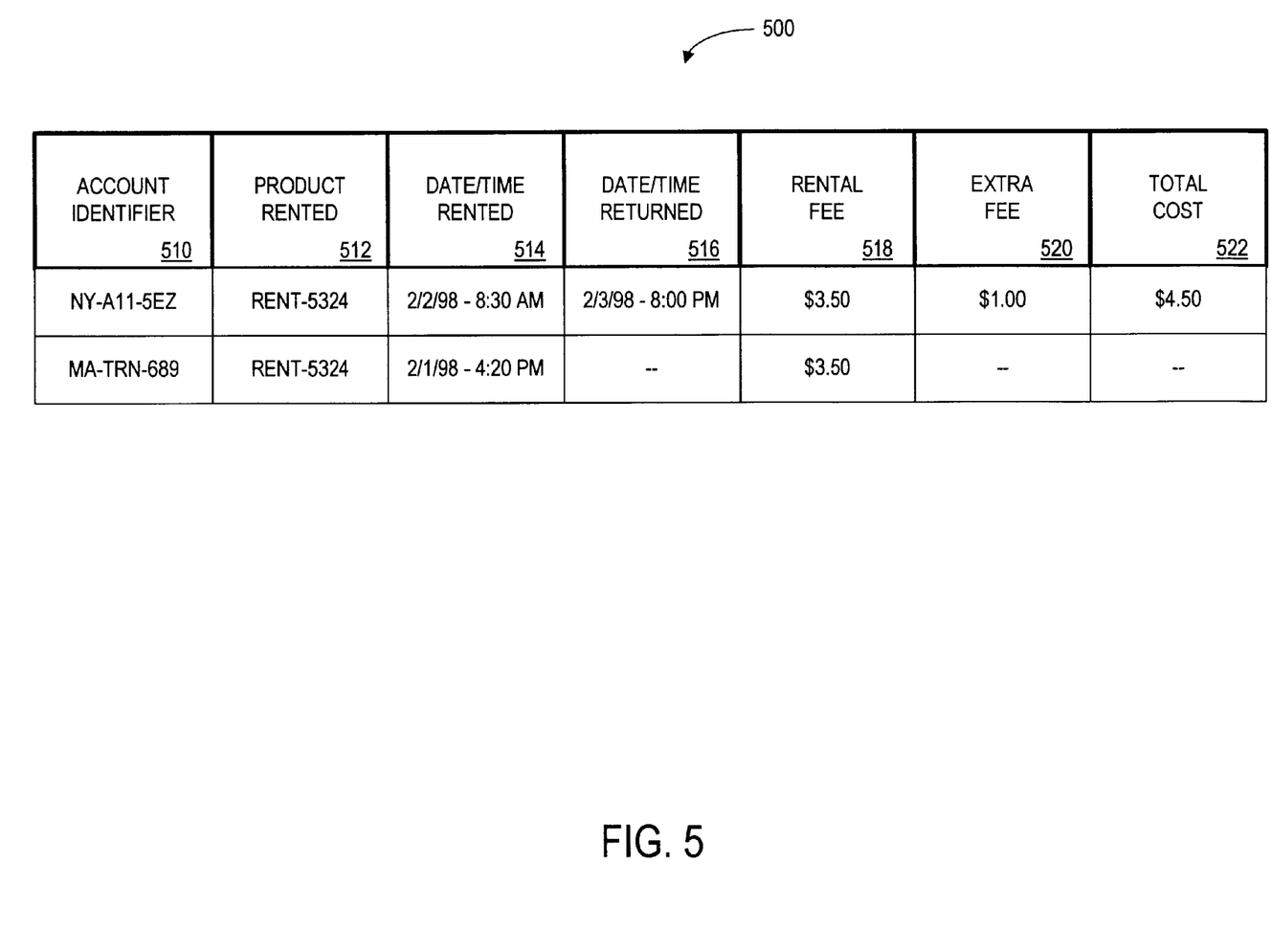
FIG. 5 depicts an exemplary rental table stored in the memory of the automated toll station of FIG. 1.

Referring now to FIG. 5, there is illustrated the contents of an exemplary rental table 500 stored by storage device 128 of the present invention. Each record of the transaction table 500 represents a rental transaction processed by toll station 100. Rental table 500 contains fields for an account identifier 510, a product rented 512, a date/time rented 514, a date/time returned 516, a rental fee 518, an extra fee 520 and a total cost 522.

Account identifier field 510 stores the account identifier of a consumer renting a product at toll station 100. Account identifier 510 is received from a transceiver associated with the consumer's vehicle and is verified with reference to account table 300. Product rented field 512 stores the product identifier corresponding to the product rented by the consumer. Date/time rented field 514 and date/time returned field 516 store time-stamps indicating when the product was distributed and returned, respectively. Rental fee field 518 represents the standard cost of renting the product for a specific time period. In the event a rented product is retained by a consumer for longer than the standard time period, extra fee field 520 may be used to impose late fees or other penalties, such as a penalty due to damage. Total cost field 522 represents the total fee amount incurred by the consumer for the rental transaction (i.e. the sum of fee fields 518 and 520). In one embodiment, the total cost of a rented product is determined by the amount of time that the product was in the consumer's possession. For example, product rental fees may accrue per-hour, per-day, etc. Upon returning a product, the processor 110 may determine a price based on the amount of time that the product was rented for, in accordance with the associated billing scheme. In another embodiment a product rental fee is determined by the distance that a consumer travelled while in possession of the rented product. This information may be derived through the use of Global Positioning System (GPS) data, odometer readings, or by determining the distance between the toll stations at which the product was rented and returned. One of ordinary skill in the art will understand that many billing schemes may be implemented by toll station 100.

Apparatus Operation

Having thus described the apparatus architecture and components of the present embodiment, the operation of the apparatus will now be described in greater detail with reference to FIGS. 6 and 7A–B, and with continuing reference to FIGS. 1–5. It is to be understood that the software instructions necessary to provide the functionality described herein are preferably stored in storage device 128 of toll station 100 as program 800, but may be stored in, for example, ROM 114.

In general, the present invention enables a toll station to efficiently distribute products to and receive products from vehicle occupants.

Product Distribution

Figure 6:
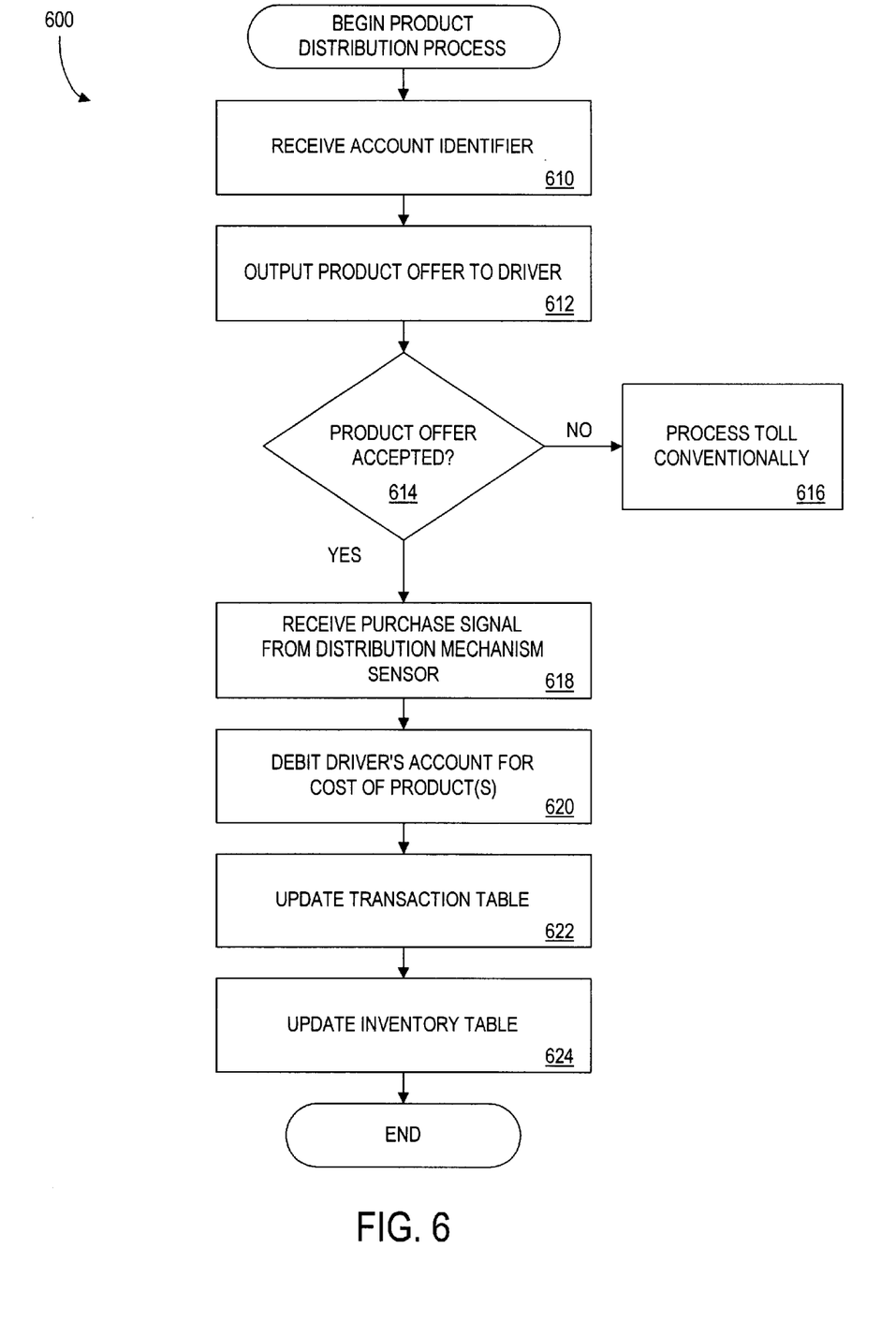
FIG. 6 is a flow chart illustrating the process steps for distributing a product according to one embodiment of the present invention.

With reference to FIG. 6, a product distribution process 600 will now be described. At step 610, communications port 118 receives the account identifier of a consumer passing through toll station 100. In one embodiment, toll station 100 employs an E-Z Pass™ system of toll collection which facilitates transfer of information between drivers and toll plazas via radio frequency signal. One of ordinary skill in the art will appreciate that any means of receiving a signal from a vehicle or related to a vehicle can be employed by toll station 100.

Toll station 100 outputs a product offer to the consumer at step 612, in which a driver is offered a product while passing through a toll booth. This step may include displaying a message on an output device (not shown), but preferably, step 612 includes presenting a product via dispensing mechanism 120 for the consumer to remove.

At step 614, toll station 100 determines whether the product offer has been accepted. If the offer is not accepted, the toll is processed conventionally at step 616. Acceptance may be inferred from a motorist physically removing a product from dispensing mechanism 120 while driving through a toll plaza. The product removal is detected by sensor 122 which generates a purchase signal (step 618), that is received by processor 110. The received signal triggers: (i) processor 110 to execute a function that charges the consumer's account for the cost of the product, and (ii) the dispensing mechanism to replace the purchased product. One of ordinary skill in the art will appreciate that each toll lane may have one or more dispensing mechanisms to further increase toll plaza throughput. At step 620, the account corresponding to the account number received at step 610 is debited in accordance with the price of the product. Processor 110 updates transaction table 400 to reflect the purchase at step 622. Processor 110 also updates inventory table 200 at step 624 to reflect the purchase.

Product Reception Process

Figure 7A:
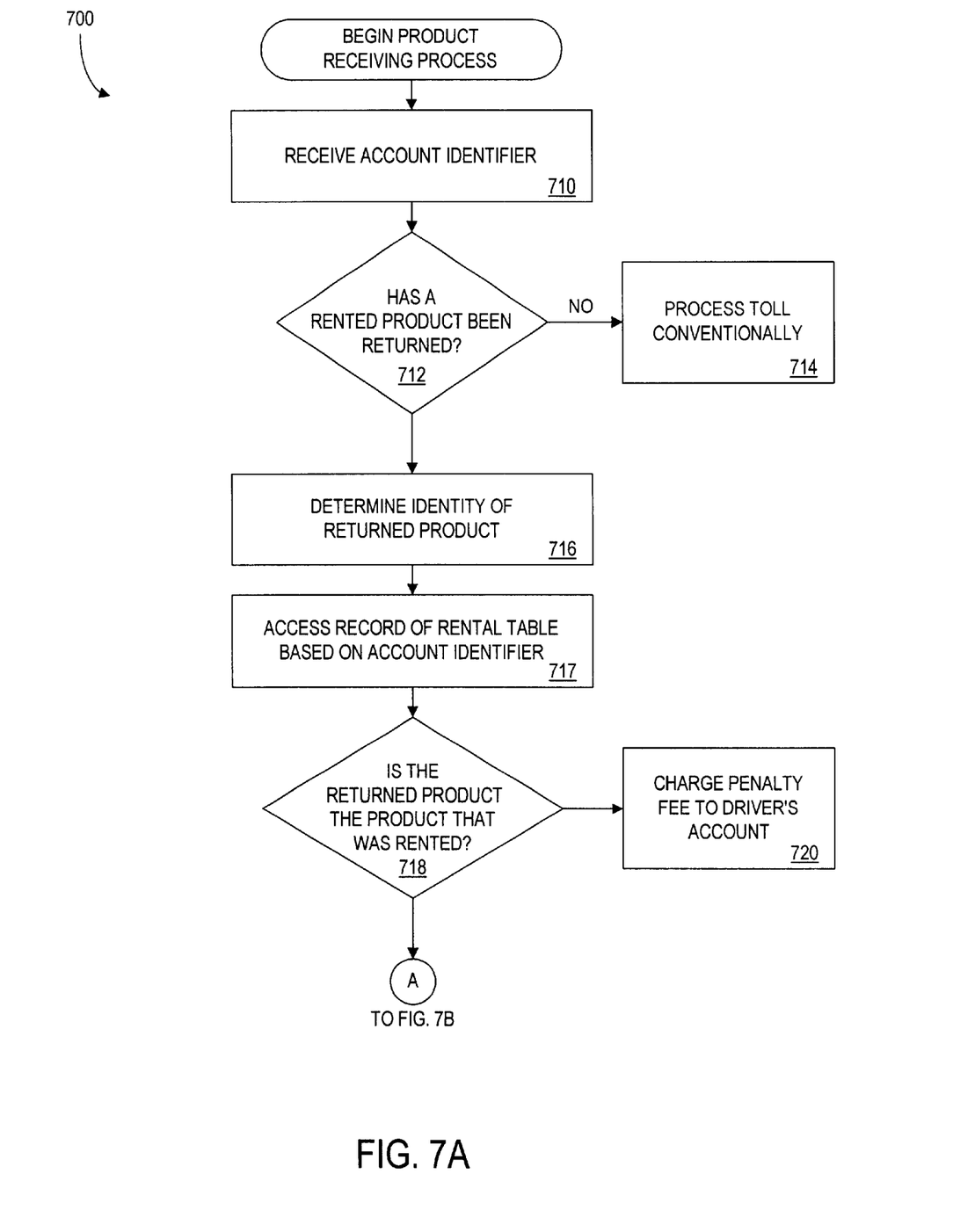
FIGS. 7A–B are a flow chart illustrating the process steps for receiving a product according to one embodiment of the present invention.
Figure 7B:
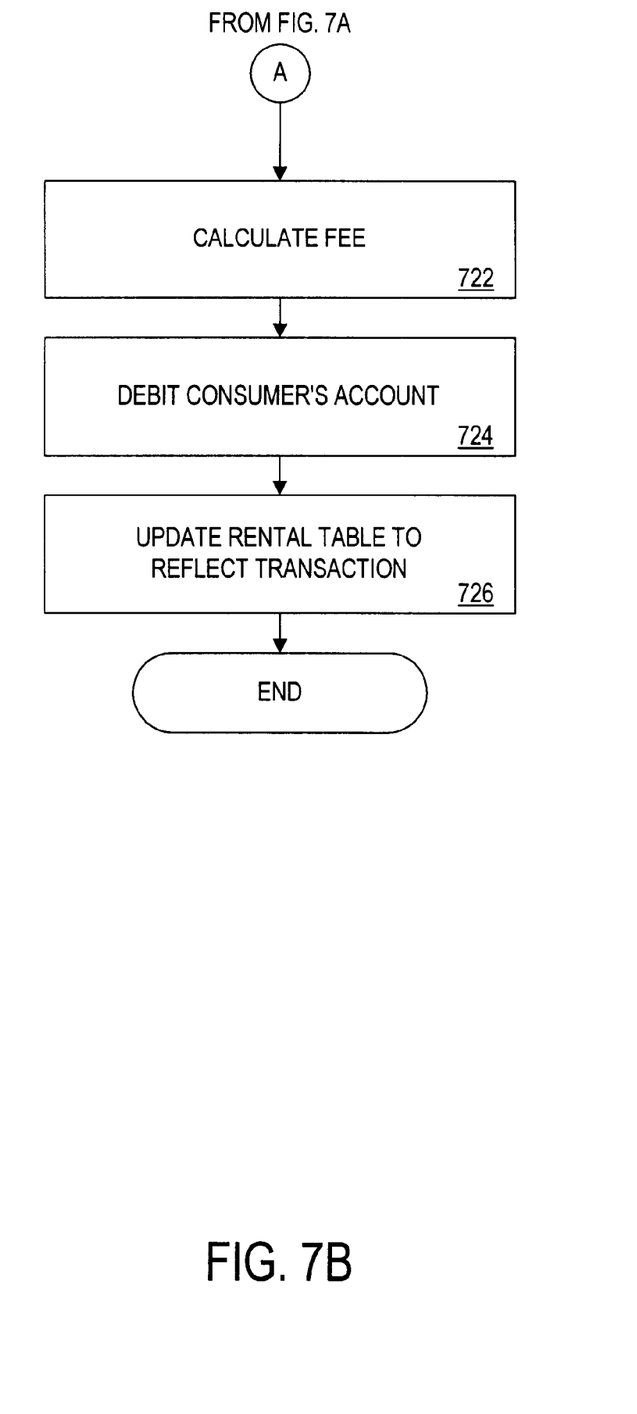

Referring now to FIGS. 7A–B, there is illustrated an exemplary product receiving process 700. Process 700 enables toll station 100 to receive products returned by occupants of a vehicle passing through a toll plaza. Process 700 is particularly well suited to be used to operate a rental business, such that products are distributed at a first toll station and returned at a later time to either the first toll station or a second toll station having access to relevant account and rental data.

At step 710, toll station 100 receives an account identifier in a fashion substantially similar to that described with reference to step 610. After receiving an account identifier (step 710), processor 110 determines whether a product has been returned (step 712). Preferably, vehicle occupants will be directed to return a product by placing it in receiving mechanism 124. Sensor 126 associated with the receiving mechanism 124 is activated upon receiving a returned product, and sends a signal to processor 110 indicating that a product has been returned. The sensor 126 may comprise any device that is able to detect the presence of an object. If no product has been returned, process flow is directed to step 714, at which a toll for the vehicle is conventionally received and processed.

At step 716, the identity of the returned product is determined through the use of input device 125, controlled by processor 110. Input device 125 may comprise, for example, a bar code scanner, digital imaging system, or any other means for determining a product's identity. Processor 110 accesses the relevant record(s) of rental table 500, based on the account identifier received at step 710. The relevant record(s) of rental table 500 are used at step 718 to determine whether the identity of the returned product matches a product that was rented by the consumer with the associated account identifier. If the identity of the returned product does not match the identity of an entry in field 512 received at step 710, the consumer's associated account is charged a penalty fee. The penalty fee may be for the retail cost of the rented product, in addition to a stocking fee charged by operators of toll station 100. A penalty fee may also be charged to the accounts of consumers who return products after the product's expected date/time returned, stored in field 516 of table 5. Other fees may be charged as will be determined by those skilled in the art.

At step 722, the total rental fee is calculated. The consumer's account is debited for the amount of the rental fee at step 724, and at step 726, processor 110 updates the rental table 500 to reflect the return of the rental product. Specifically, at step 726, the date/time returned field 516, extra fee field 520 and total fee field 522 of the relevant rental record are updated. In another embodiment the consumer may be required to provide a deposit amount for each rented product. In such an embodiment, a consumer's account would be credited for the amount of the deposit minus rental and other fees upon the return of the product. In yet another embodiment, consumers with poor product return histories may be denied rental privileges.

It is to be understood that the method and apparatus of the present invention has many applications, and that the present invention is not limited to the representative examples disclosed herein. Moreover, the scope of the present invention covers conventionally known variations and modifications to the system components described herein.

What is claimed is:

1. A method for receiving a product at a toll station, the method comprising:
   receiving an account identifier that indicates an account;
   detecting receipt of a product;
   determining a product identifier corresponding to the product;
   determining whether there is an association between the product identifier and the account identifier;
   processing a transaction based on the account identifier and the product identifier;
   determining a first location identifier representing a dispensing location associated with the product;
   determining a second location identifier representing a return location associated with the product; and
   calculating a transaction amount based on the first location identifier and the second location identifier; and
   wherein the processing is based on the transaction amount.

2. The method of claim 1, in which the step of determining the first location identifier comprises receiving a Global Positioning System signal.

3. The method of claim 1, in which the step of determining the second location identifier comprises receiving a Global Positioning System signal.

4. The method of claim 1, in which the step of determining the first location identifier comprises receiving an odometer measurement.

5. The method of claim 1, in which the step of determining the second location identifier comprises receiving an odometer measurement.

6. An automatic sales machine for receiving a product at a toll station, the sales machine comprising:
   a processor;
   a memory connected to said processor storing a program to control the operation of said processor;
   the processor operative with the program in the memory to:
   receive an account identifier that indicates an account;
   detect receipt of a product;
   determine a product identifier corresponding to the product;
   determine whether there is an association between the product identifier and the account identifier;
   process a transaction based on the account identifier and the product identifier;
   determine a first location identifier representing a dispensing location associated with the product;
   determine a second location identifier representing a return location associated with the product;
   calculate a transaction amount based on the first location identifier and the second location identifier; and
   process the transaction based on the transaction amount.

7. An automatic sales machine for receiving a product at a toll station, the sales machine comprising:
   means for receiving an account identifier indicating an account;
   means for detecting receipt of a product;
   means for determining a product identifier corresponding to the product;
   means for determining whether there is an association between the product identifier and the account identifier;
   means for processing a transaction based on the account identifier and the product identifier;
   means for determining a first location identifier representing a dispensing location associated with the product;
   means for determining a second location identifier representing a return location associated with the product;
   means for calculating a transaction amount based on the first location identifier and the second location identifier; and
   wherein the means for processing the transaction operates based on the transaction amount.

* * * * *